United States Patent
Mizobe

(10) Patent No.: US 10,521,899 B2
(45) Date of Patent: Dec. 31, 2019

(54) RUNWAY ILLUMINATION LIGHT INSPECTION APPARATUS AND RUNWAY ILLUMINATION LIGHT INSPECTION METHOD

(71) Applicant: NEC LIGHTING, LTD., Tokyo (JP)

(72) Inventor: Norimasa Mizobe, Tokyo (JP)

(73) Assignee: Hotalux, Ltd., Tokyo (JP)

( * ) Notice: Subject to any disclaimer, the term of this patent is extended or adjusted under 35 U.S.C. 154(b) by 0 days.

(21) Appl. No.: 15/766,161

(22) PCT Filed: Sep. 23, 2016

(86) PCT No.: PCT/JP2016/078108
§ 371 (c)(1),
(2) Date: Apr. 5, 2018

(87) PCT Pub. No.: WO2017/061286
PCT Pub. Date: Apr. 13, 2017

(65) Prior Publication Data
US 2018/0286029 A1 Oct. 4, 2018

(30) Foreign Application Priority Data
Oct. 8, 2015 (JP) ................................. 2015-200433

(51) Int. Cl.
*G06T 7/00* (2017.01)
*F21S 8/02* (2006.01)
(Continued)

(52) U.S. Cl.
CPC ............. *G06T 7/001* (2013.01); *B08B 5/02* (2013.01); *F21S 8/022* (2013.01); *H04N 5/2256* (2013.01);
(Continued)

(58) Field of Classification Search
CPC ................. F21W 2111/02; G06T 2207/10004
See application file for complete search history.

(56) References Cited

U.S. PATENT DOCUMENTS

| 4,394,079 A * | 7/1983 | Takematsu | G03B 15/05 396/165 |
| 7,136,097 B1 * | 11/2006 | Toyoda | G06T 1/20 348/222.1 |

(Continued)

FOREIGN PATENT DOCUMENTS

| CN | 103018785 A * | 4/2013 |
| JP | 02-066887 A | 3/1990 |

(Continued)

OTHER PUBLICATIONS

James NG, "Accreditation of ISO 55001/PAS 55 for AGL System in Hong Kong International Airport", Hong Kong International Airport, Jul. 8, 2015.

(Continued)

*Primary Examiner* — Mainul Hasan
(74) *Attorney, Agent, or Firm* — Sughrue Mion, PLLC

(57) ABSTRACT

The runway illumination light inspection apparatus includes: an illumination light detection unit; an image capturing unit; and a determination unit. The illumination light detection unit detects an illumination light embedded in a runway the image capturing unit captures, when the illumination light detection unit has detected the illumination light, an image of the illumination light, and the determination unit determines whether or not the illumination light is abnormal, based on the captured image of the illumination light.

15 Claims, 2 Drawing Sheets

(51) Int. Cl.
    *H04N 5/225*     (2006.01)
    *H04N 5/28*     (2006.01)
    *B08B 5/02*     (2006.01)
    *B08B 1/00*     (2006.01)
    *F21W 111/02*     (2006.01)

(52) U.S. Cl.
    CPC .............. *H04N 5/28* (2013.01); *B08B 1/002* (2013.01); *B08B 1/006* (2013.01); *F21W 2111/02* (2013.01); *G06T 2207/10004* (2013.01); *G06T 2207/10141* (2013.01)

(56) References Cited

U.S. PATENT DOCUMENTS

2002/0093433 A1*   7/2002   Kapadia ................ B64F 1/002
                                                          340/945

2015/0146197 A1*   5/2015   Le Cam ................ G01J 1/0242
                                                          356/222

FOREIGN PATENT DOCUMENTS

| | | |
|---|---|---|
| JP | H0719958 A * | 1/1995 |
| JP | 07-329895 A | 12/1995 |
| JP | 10-207504 A | 8/1998 |
| JP | 2004-146281 A | 5/2004 |
| JP | 2005-275723 A | 10/2005 |
| JP | 2011-112621 A | 6/2011 |

OTHER PUBLICATIONS

International Search Report for PCT/JP2016/078108 dated Nov. 8, 2016.

* cited by examiner

RUNWAY ILLUMINATION LIGHT INSPECTION APPARATUS AND RUNWAY ILLUMINATION LIGHT INSPECTION METHOD

CROSS REFERENCE TO RELATED APPLICATIONS

This application is a National Stage of International Application No. PCT/JP2016/078108 filed Sep. 23, 2016, claiming priority based on Japanese Patent Application No. 2015-200433 filed Oct. 8, 2015.

TECHNICAL FIELD

The present invention relates to a runway illumination light inspection apparatus and a runway illumination light inspection method.

BACKGROUND ART

A number of illumination lights are embedded in runways at airports and the like. If a screw included in such a runway illumination light becomes loose and comes out, there is the risk that the screw may hit an aircraft, causing a major accident. Furthermore, if a runway illumination light is dirty, its function as an illumination light will be impaired.

Conventionally, inspection as to, for example, whether or not screws of the runway illumination lights are loose, or whether or not the runway illumination lights are dirty is conducted during time periods in which no aircraft are landing and taking off, in such a manner that the illumination lights are individually subjected to a screw torque check or visual observation. But, due to the large number of illumination lights, such inspection must be conducted frequently, which is burdensome.

To solve this problem, an inspection system has been proposed that continuously shoots images of a runway using a high-speed camera installed on an inspection vehicle (Non-Patent Document 1).

CITATION LIST

Non-Patent Document(s)

Non-Patent Document 1: James Ng, "Accreditation of ISO 55001/PAS 55 for AGL System in Hong Kong International Airport", [online], INTERNATIONAL CIVIL AVIATION ORGANIZATION, [searched on Sep. 8, 2015], Internet <URL: http://www.icao.int/APAC/Meetings/2015%20VisualAids/ICAO%20Regional%20Work shop%20with%20CCD%20comment%20rev18%20I-CAO%20Adi.pdf>

BRIEF SUMMARY OF THE INVENTION

Problem to be Solved by the Invention

However, the above-described inspection system continuously shoots images of a runway that includes a place where no illumination light is provided, and thus the amount of data is enormous, and it takes time to determine whether or not an illumination light is abnormal.

Accordingly, it is an object of the present invention to provide a runway illumination light inspection apparatus and a runway illumination light inspection method that require the minimal amount of data and can determine whether or not illumination lights are abnormal in a short time period.

Means for Solving Problem

In order to achieve the above-described object, the runway illumination light inspection apparatus according to the present invention includes: an illumination light detection unit; an image capturing unit; and a determination unit, wherein the illumination light detection unit detects an illumination light embedded in a runway, the image capturing unit captures, when the illumination light detection unit has detected the illumination light, an image of the illumination light, and the determination unit determines whether or not the illumination light is abnormal, based on the captured image of the illumination light.

The runway illumination light inspection method according to the present invention includes: an illumination light detection step of detecting an illumination light embedded in a runway; an image capturing step of capturing, when the illumination light has been detected in the illumination light detection step, an image of the illumination light; and a determination step of determining whether or not the illumination light is abnormal, based on the image of the illumination light captured in the image capturing step.

Effects of the Invention

According to the present invention, it is possible to provide a runway illumination light inspection apparatus and a runway illumination light inspection method that require the minimal amount of data and can determine whether or not illumination lights are abnormal in a short time period.

MODE FOR CARRYING OUT THE INVENTION

Figure 1A:
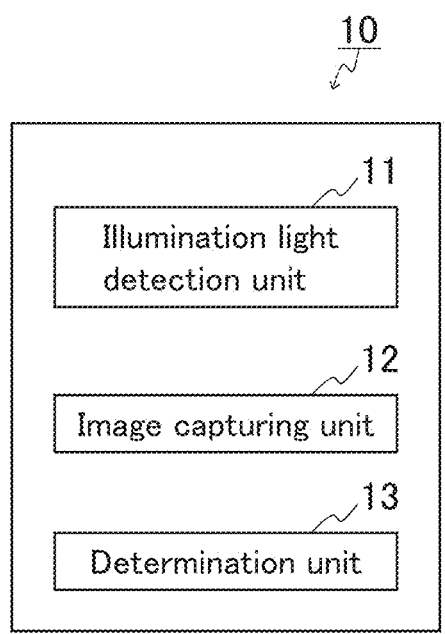
FIG. 1A is a schematic block diagram illustrating an example of a configuration of a runway illumination light inspection apparatus of Embodiment 1.

Hereinafter, the runway illumination light inspection apparatus and the runway illumination light inspection method of the present invention will be described in detail with reference to the drawings. However, the present invention is not limited to the description below. Note that there may be cases where the same reference numerals are given to the same components in FIGS. 1 to 3 below and descriptions thereof are omitted. Furthermore, in the drawings, for ease of description, illustration of the structures of the components may be simplified as appropriate, and the ratio of sizes of components and the like may be schematically indicated contrary to reality.

Embodiment 1

Figure 2:
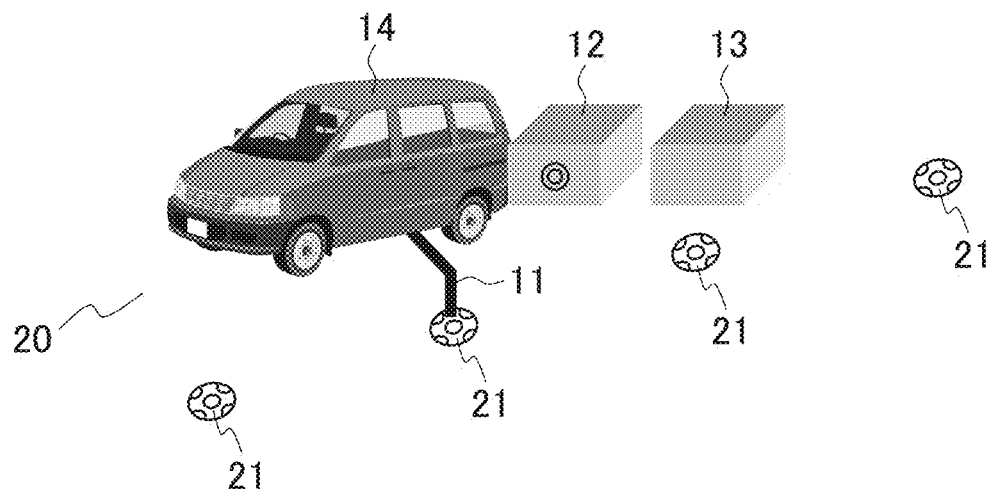
FIG. 2 is a schematic diagram illustrating another example of a configuration of the runway illumination light inspection apparatus of Embodiment 1.

FIG. 1A is a schematic block diagram illustrating an example of a configuration of the runway illumination light inspection apparatus of the present embodiment. As shown in the drawing, a runway illumination light inspection apparatus 10 includes an illumination light detection unit 11, an image capturing unit 12, and a determination unit 13. The inspection apparatus 10 of the present embodiment further includes a mobile object 14, as shown in FIG. 2 for example, and the illumination light detection unit 11 and the image capturing unit 12 may be installed on the mobile object 14. In FIG. 2, a vehicle is exemplified as the mobile object 14, but the mobile object 14 may be any mobile object as long as it can move on a runway 20. Furthermore, the mobile object 14 may be, for example, an object that a person gets in and drives and steers so that it moves on the runway 20, an object that is remotely-operated by a person to move on the runway 20, or an object in which an autonomous driving program is installed and that moves autonomously on the runway 20. The illumination light detection unit 11 detects an illumination light 21 embedded in the runway 20. When the illumination light detection unit 11 has detected the illumination light 21, the image capturing unit 12 captures an image of the illumination light 21. The determination unit 13 determines whether or not the illumination light 21 is abnormal, based on the captured image of the illumination light 21.

The illumination light detection unit 11 may be any illumination light detection unit as long as it can detect the illumination lights 21, but may preferably be a metal sensor for example, because the illumination lights 21 each contain a lot of metal members.

Also the image capturing unit 12 may be any image capturing unit as long as it can capture an image of the illumination light 21, and examples thereof include a CCD (Charge Coupled Device) camera, a CMOS (Complementary Metal Oxide Semiconductor) camera, and a high-speed camera. Among these, the high-speed camera is preferable.

The determination unit 13 may be any determination unit as long as it can determine whether or not the illumination light 21 is abnormal, based on the captured image of the illumination light 21, and examples thereof include a server. In the inspection apparatus 10 of the present embodiment, the determination unit 13 is installed on the mobile object 14, as shown in FIG. 2.

Figure 1B:
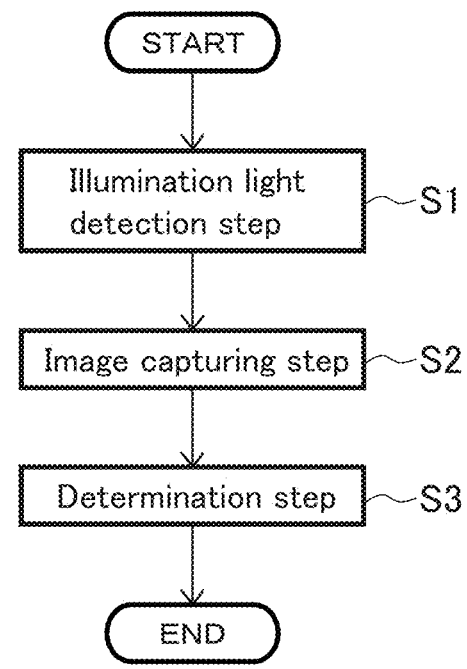
FIG. 1B is a flowchart illustrating an example of a runway illumination light inspection method of Embodiment 1.

The following will describe, using FIG. 1B, the runway illumination light inspection method of the present embodiment. The inspection method of the present embodiment can be implemented using the inspection apparatus 10 of the present embodiment that is shown in FIGS. 1A and 2.

FIG. 1B is a flowchart illustrating an example of the runway illumination light inspection method of the present embodiment. In the inspection method of the present embodiment, first, the illumination light detection unit 11 detects an illumination light 21 embedded in the runway 20 (step S1).

When the illumination light 21 has been detected by the illumination light detection unit 11, then the image capturing unit 12 captures an image of the illumination light 21 (step S2). In this step, preferably, the image capturing unit 12 captures images of the illumination light 21 from a plurality of directions. If images of the illumination light 21 are captured from a plurality of directions, it will be possible to produce three-dimensional data of the illumination light 21, thus making it possible to improve the accuracy in determination as to whether or not the illumination light 21 is abnormal.

Then, the determination unit 13 determines, based on the image of the illumination light 21 captured by the image capturing unit 12, whether or not the illumination light 21 is abnormal (step S3). The determination in this step as to whether or not the illumination light 21 is abnormal can be performed in the following manner, for example. That is, an image of the illumination light 21 in a normal state has been captured in advance, and is compared with the image of the illumination light 21 captured by the image capturing unit 12 during the inspection, and the illumination light 21 is determined as being abnormal if there is a difference between the images, for example, if a screw is loose or has come out or the illumination light 21 is dirty in the image captured during the inspection, and the illumination light 21 is determined as being normal if there is no difference between the images. As an image of the illumination light 21 in the normal state, an image serving as a model that is stored in advance in the determination unit 13 may be used, or an image of when the illumination light 21 was determined as being normal in a previous inspection may be used, for example. Furthermore, with respect to the looseness of a screw that may cause a particularly serious accident, it is possible to mark, in advance, the screw in a state in which it is not loose, and to determine whether or not the illumination light 21 is abnormal based on whether or not the mark has shifted, or it is also possible to determine whether or not the illumination light 21 is abnormal based on the height of the screw head, because if a screw is loose, the position of its screw head is located higher than that in a normal state.

According to the inspection apparatus and the inspection method of the present embodiment, only when an illumination light has been detected by the illumination light detection unit, the image capturing unit captures an image of the illumination light, and thus it is possible to suppress the amount of data to the requisite minimum amount compared to a case of continuously shooting images of a runway including a place at which no illumination light is provided, and as a result, the determination of whether there is an abnormality can be performed by the determination unit in a short time period.

The inspection apparatus 10 of the present embodiment may further include a mobile object speed calculation unit. The mobile object speed calculation unit detects the speed of the mobile object 14, and calculates the time at which the mobile object 14 is to pass by the illumination light 21. Since illumination lights 21 are often embedded in the runway 20 with regularity, if the mobile object speed calculation unit is included, it will be possible to estimate the time at which the illumination light 21 is to be detected by the illumination light detection unit 11 and to capture an image of the illumination light 21 using the image capturing unit 12, more accurately. The mobile object speed calculation unit may be installed on the mobile object 14, or may be provided at a position external to the mobile object 14 so that the detection of the speed of the mobile object 14 and the calculation of the time at which the mobile object 14 is to pass by the illumination light 21 are performed at the position external to the mobile object 14.

The inspection apparatus 10 of the present embodiment may further include a flashing light. When the illumination light detection unit 11 has detected an illumination light 21, the flashing light irradiates the illumination light 21 with a flash. Inspection of the illumination light 21 is often performed, for example, in the middle of the night in which no aircraft are landing and taking off, but if the flashing light is included, it will be possible for the image capturing unit 12 to capture an image of the illumination light 21 even in a dark environment such as the middle of the night. For example, the flashing light may be so small that it can be installed on the mobile object 14. In this case, the flashing light may be installed on the image capturing unit 12 as a flash for example, or may be an independent flashing light separate from the image capturing unit 12. Alternatively, the flashing light may be, for example, a flashing light arranged in the airport or the like to inspect the illumination lights 21, so that the illumination lights 21 can be illuminated with a flash.

The inspection apparatus 10 of the present embodiment may further include a GPS (Global Positioning System) installed on the mobile object 14. Although there are many illumination lights 21 embedded in the runway 20, if GPS is included and positional information can be acquired, it will be possible to clearly grasp a position on the runway 20 where the illumination light 21 of which an image was captured by the image capturing unit 12 is embedded.

The inspection apparatus 10 of the present embodiment may further include a dirt removal unit configured to remove dirt on the illumination light 21, the dirt removal unit being installed on the mobile object 14. If the dirt removal unit is included, it will be possible to remove dirt on an illumination light 21 during the inspection of the illumination light 21. Examples of the dirt removal unit include a blowing unit for blowing off dirt on the illumination light 21, a sweeping unit for sweeping away dirt on the illumination light 21, and a wiping unit for wiping off dirt on the illumination light 21.

Embodiment 2

Figure 3:
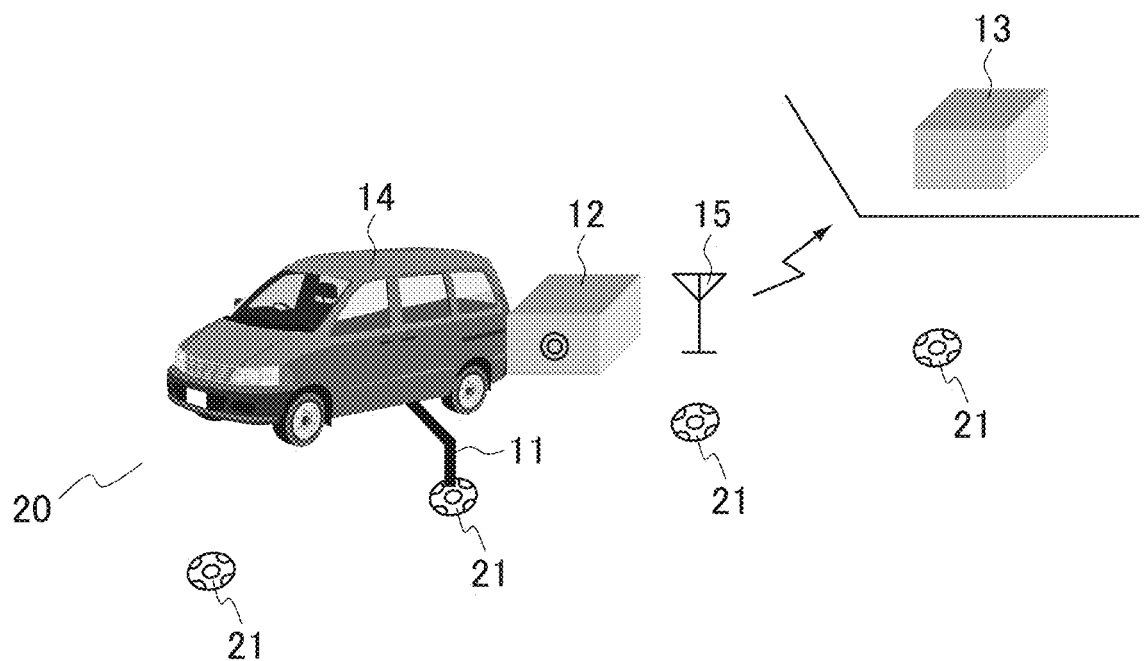
FIG. 3 is a schematic diagram illustrating an example of a configuration of a runway illumination light inspection apparatus of Embodiment 2.

FIG. 3 shows an example of a configuration of the runway illumination light inspection apparatus of the present embodiment. As shown in FIG. 3, the inspection apparatus of the present embodiment includes a communication unit 15 installed on the mobile object 14, and is the same as the inspection apparatus of Embodiment 1 shown in FIG. 2 except that the communication unit 15 transmits the captured image of the illumination light 21 to the determination unit 13, which serves as the server.

The runway illumination light inspection method using the inspection apparatus of the present embodiment is the same as the inspection method of Embodiment 1 except that, between the image capturing step in which the image capturing unit 12 captures an image of the illumination light 21 and the determination step in which the determination unit 13 determines whether or not the illumination light 21 is abnormal, the communication unit 15 transmits the captured image of the illumination light 21 to the determination unit 13.

Also with the inspection apparatus and the inspection method of the present embodiment, it is possible to achieve the same effects as those of the inspection apparatus and inspection method of Embodiment 1. Furthermore, according to the inspection apparatus and the inspection method of the present embodiment, it is possible to grasp a determination result as to whether or not the illumination light 21 is abnormal, at a position external to the mobile object 14.

The runway illumination light inspection apparatus of the present invention may also be a runway illumination light inspection system.

The present invention has been described so far with reference to the embodiments but the present invention is not limited to the foregoing embodiments. Various modifications on the configuration and details of the present invention that are understandable by a person skilled in the art are possible within a scope of the present invention.

This application claims the priority based on Japanese Patent Application No. 2015-200433 filed on Oct. 8, 2015, the disclosure of which is incorporated herein in its entirety.

INDUSTRIAL APPLICABILITY

According to the present invention, it is possible to provide a runway illumination light inspection apparatus and a runway illumination light inspection method that require the minimal amount of data and can determine whether or not illumination lights are abnormal in a short time period. The inspection apparatus and the inspection method according to the present invention are widely applicable to the determination of whether or not illumination lights embedded in a runway are abnormal.

EXPLANATION OF REFERENCE NUMERALS

10 Inspection apparatus
11 Illumination light detection unit
12 Image capturing unit
13 Determination unit
14 Mobile object
15 Communication unit
20 Runway
21 Illumination light

The invention claimed is:

1. A runway illumination light inspection apparatus comprising:
   an illumination light detection unit;
   an image capturing unit;
   a determination unit; and
   a flashing light,
   wherein the illumination light detection unit comprises a metal sensor configured to detect a metal member of an illumination light fixture embedded in a runway,
   the image capturing unit captures, when the illumination light detection unit has detected the illumination light, an image of the illumination light,
   the determination unit comprises a server configured to:
   compare objects present in the captured image of the illumination light with objects present in an image of the illumination light in a normal state captured in advance, and
   determine whether or not the illumination light is abnormal based on a result of the comparison, and
   the flashing light is arranged so as to irradiate the illumination light with a flash, and when the illumination light detection unit has detected the illumination light, the flashing light irradiates the illumination light with a flash.

2. The runway illumination light inspection apparatus according to claim 1, further comprising:
   a mobile object,
   wherein the illumination light detection unit and the image capturing unit are installed on the mobile object.

3. The runway illumination light inspection apparatus according to claim 2, further comprising:
   a mobile object speed calculation unit,
   wherein the mobile object speed calculation unit detects a speed of the mobile object and calculates a time at which the mobile object is to pass by the illumination light.

4. The runway illumination light inspection apparatus according to claim 2, further comprising:

a flashing light,
wherein the flashing light is installed on the mobile object, and when the illumination light detection unit has detected the illumination light, the flashing light irradiates the illumination light with a flash.

5. The runway illumination light inspection apparatus according to claim 2, further comprising:
a GPS that is installed on the mobile object.

6. The runway illumination light inspection apparatus according to claim 2,
wherein the determination unit is installed on the mobile object.

7. The runway illumination light inspection apparatus according to claim 2, further comprising:
a communication unit installed on the mobile object,
wherein the determination unit serves as a server, and
the communication unit transmits a captured image of the illumination light to the determination unit that serves as the server.

8. The runway illumination light inspection apparatus according to claim 1,
wherein the image capturing unit is a high-speed camera.

9. The runway illumination light inspection apparatus according to claim 1,
wherein the image capturing unit captures images of the illumination light from a plurality of directions.

10. The runway illumination light inspection apparatus according to claim 2, further comprising:
a dirt removal unit configured to remove dirt on the illumination light, the dirt removal unit being installed on the mobile object, the dirt removal unit comprising at least one from among a blowing unit, a sweeping unit, and a wiping unit.

11. A runway illumination light inspection method comprising:
an illumination light detection step of detecting a metal member of an illumination light fixture embedded in a runway;
an image capturing step of capturing, when the illumination light has been detected in the illumination light detection step, an image of the illumination light;
a comparison step of comparing the captured image of the illumination light with an image of the illumination light in a normal state captured in advance; and
a determination step of determining whether or not the illumination light is abnormal based on a result of the comparison step; and
an irradiation step of irradiating, when the illumination light has been detected in the illumination light detection step, the illumination light with a flash using a flashing light.

12. The runway illumination light inspection method according to claim 11,
wherein, in the image capturing step, the illumination light is irradiated with a flash.

13. The runway illumination light inspection method according to claim 11,
wherein, in the image capturing step, images of the illumination light are captured from a plurality of directions.

14. The runway illumination light inspection apparatus according to claim 1,
wherein the determination unit is configured to determine that the illumination light is abnormal in response to there being a difference between the captured image of the illumination light and the image of the illumination light in a normal state captured in advance, the difference being due to a fastener being out of position in the captured image of the illumination light, and
wherein the determination unit is configured to determine that the illumination light is normal in response to there being no difference between the captured image of the illumination light and the image of the illumination light in a normal state captured in advance.

15. The runway illumination light inspection method according to claim 11,
wherein the determination step comprises determining that the illumination light is abnormal in response to there being a difference between the captured image of the illumination light and the image of the illumination light in a normal state captured in advance, the difference being due to a fastener being out of position in the captured image of the illumination light, and
wherein the determination step comprises determining that the illumination light is normal in response to there being no difference between the captured image of the illumination light and the image of the illumination light in a normal state captured in advance.

* * * * *